US006434639B1

United States Patent
Haghighi

(10) Patent No.: US 6,434,639 B1
(45) Date of Patent: Aug. 13, 2002

(54) SYSTEM FOR COMBINING REQUESTS ASSOCIATED WITH ONE OR MORE MEMORY LOCATIONS THAT ARE COLLECTIVELY ASSOCIATED WITH A SINGLE CACHE LINE TO FURNISH A SINGLE MEMORY OPERATION

(75) Inventor: Siamack Haghighi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/191,923

(22) Filed: Nov. 13, 1998

(51) Int. Cl.[7] .......................... G06F 13/14; G06F 13/16
(52) U.S. Cl. ........................ 710/39; 710/35; 711/3; 711/100; 711/118; 711/167
(58) Field of Search ................. 710/35, 39; 711/118, 711/167, 100, 3

(56) References Cited

U.S. PATENT DOCUMENTS

| 5,434,993 A | * | 7/1995 | Liencres et al. | ............ 395/425 |
| 5,446,855 A | * | 8/1995 | Dang et al. | ................. 395/401 |
| 5,459,842 A | * | 10/1995 | Begun et al. | ................. 395/250 |
| 5,535,340 A | | 7/1996 | Bell et al. | .................... 395/292 |
| 6,012,118 A | * | 1/2000 | Jaykumar et al. | ........... 710/126 |
| 6,021,467 A | * | 2/2000 | Konigsburg et al. | ........ 711/122 |

FOREIGN PATENT DOCUMENTS

JP    410116228 A   *   5/1998    ............ G06F/12/08

OTHER PUBLICATIONS

"Handling the L2–Pipeline Least–Recently–Used", IBM TDB vol. 36, No. 12 Dec. 1993, pp. 621–624.*
"Mechanism to Detect and Supress Sur–Stores in Store Stacks", IBM TDB vol. 36, No. 12 Dec. 1993, pp. 559–560.*
"Parallel Synchronization with Hardware Collision Detection and Software Combining", IBM Technical Bulletin, vol. 32, Issue 4A, pp. 259–261, Sep. 1989.*

* cited by examiner

Primary Examiner—Jeffrey Gaffin
Assistant Examiner—Rehana Perveen
(74) Attorney, Agent, or Firm—Trop, Pruner & Hu, P.C.

(57) ABSTRACT

A method and apparatus are for use with a computer system. Write requests to store data in one or more memory locations that are collectively associated with a cache line are received. The first requests are combined to furnish a memory operation. The computer system may include a peripheral device that furnishes a stream of data to be stored in a memory, and the apparatus may include first and second interfaces, a queue and logic. The first interface is adapted to convert a portion of the stream of data into a first request, and the queue is adapted to store the second request. The logic is adapted to determine if the first and second requests target memory locations that are collectively associated with a cache line and based on the determination, selectively combine the first and second requests. The second interface is adapted to furnish a memory operation in response to the combination of the first and second requests. The requests may be, as examples, read requests and/or write requests.

29 Claims, 5 Drawing Sheets

SYSTEM FOR COMBINING REQUESTS ASSOCIATED WITH ONE OR MORE MEMORY LOCATIONS THAT ARE COLLECTIVELY ASSOCIATED WITH A SINGLE CACHE LINE TO FURNISH A SINGLE MEMORY OPERATION

BACKGROUND

The invention relates to reducing bus loading due to snoop traffic.

Referring to FIG. 1, a typical computer system 10 may include a level one (L1) cache 14 to expedite transactions between a microprocessor 16 and a system memory 18, such as a dynamic random access (DRAM) memory. To accomplish this, the cache 14 typically includes a static random access memory (SRAM) that typically is more expensive and faster than the system memory 18. Usually, the cache 14 retains a copy of data in the most recently accessed (by the microprocessor 16) memory locations to make these locations "cached locations." In this manner, when the microprocessor 16 executes a memory read operation, for example, to retrieve data from one of the cached locations, the cache 14, instead of the system memory 18, provides the data to the microprocessor 16. As a result, the read operation is accomplished in less time than if the data is retrieved from the slower system memory 18. Because of the cache 14, memory write operations by the microprocessor 16 may also be accomplished in less time, as the data may be stored in the cache 14 instead of in the system memory 18. The cache 14 typically is integrated with the microprocessor 16 and may be accessed by devices other than the microprocessor 16 via a local bus 22 that is coupled to the microprocessor 16.

Because devices other than the microprocessor 16 typically interact with the system memory 18, measures typically are in place to preserve coherency between data stored in the cache 14 and data stored in the system memory 18. For example, a bridge 23 may furnish a memory write operation to a cached location. In short, the cache 14 may implement a variety of different protocols to preserve data coherency.

For example, for a "write-through" protocol, the write operation furnished by the bridge 23 in the above example causes the cache 14 to invalidate a corresponding cache line in the cache 14. A cache line typically includes several bytes of data that are associated with contiguous memory locations. When the microprocessor 16 executes a memory write operation that targets a memory location that is associated with a cache line, then a "write hit" occurs. In general, to determine when a cache hit (i.e., a write or read (described below) hit) occurs, a bus operation called "snooping" occurs on the local bus 22. In response to this write hit, the cache 14 updates the corresponding cache line and the corresponding locations in the system memory 18 pursuant to the write-through policy. However, when a device other than the microprocessor 16 writes to a memory location that is associated with the cache line, then the cache 14 invalidates the cache line, as at least some of the data of the cache line has become "stale." Read operations are handled in a slightly different manner. When the microprocessor 16 executes a memory read operation, the cache 14 determines if a "read hit" occurs. A read hit occurs if the read operation targets a memory location that is associated with a cache line that has not been invalidated. When a read hit occurs, the cache 14 (and not the slower system memory 18) provides the requested data. Otherwise, the system memory 18 provides the requested data.

The cache 14 may alternatively implement a "write-back" policy that improves the performance of memory write operations (versus the "write-through" policy described above) by eliminating the slower writes to system memory 18 every time the cache 14 is updated. Instead, the system memory 18 is updated when coherency problems arise. In this manner, when the microprocessor 16 writes data to a memory location associated with a cache line, a write hit occurs, and in response to this occurrence, the cache 14 updates the corresponding cache line without updating the system memory 18. When a device other than the microprocessor 16 performs a memory write operation to a memory location that is associated with the cache line, then the cache 14 does not invalidate the associated cache line, as some of the data in the cache line may have been modified by the microprocessor 16. Instead, the cache 14 halts, or "backs off," the memory write operation and updates the memory locations in the system memory 18 that are associated with the cache line. After the system memory 18 is updated, the cache 14 permits the original write operation to proceed. For the write-back policy, a similar scenario occurs when a device other than the microprocessor 16 performs a read operation to read data from the system memory 18.

The memory write operations that are furnished by the bridge 23 may be, for example, in response to a stream of data that is produced by video camera 12. In this manner, the video camera 12 may continually provide signals indicative of frames of data to a serial bus 11 that is coupled to the bridge 23. In response, the bridge 23, in turn, may generate numerous write operations to store the data in predetermined contiguous regions of the system memory 18 where the data may be processed (decompressed, for example) by the microprocessor 16 before corresponding video images are formed on a display 20.

Unfortunately, the numerous write operations that are furnished by the bridge 23 may cause an extensive number of snooping operations on the local bus 22. The snooping operations, in turn, may consume a considerable amount of bandwidth of the local bus 22. As a result, the processing bandwidth of the microprocessor 16 may be effectively reduced.

Thus, there is a continuing need for a computer system to more efficiently handle a stream of data.

SUMMARY

In one embodiment, a method for use with a computer system includes receiving requests to store data in one or more memory locations that are collectively associated with a cache line. The requests are combined to furnish a memory operation.

DETAILED DESCRIPTION

Figure 1:
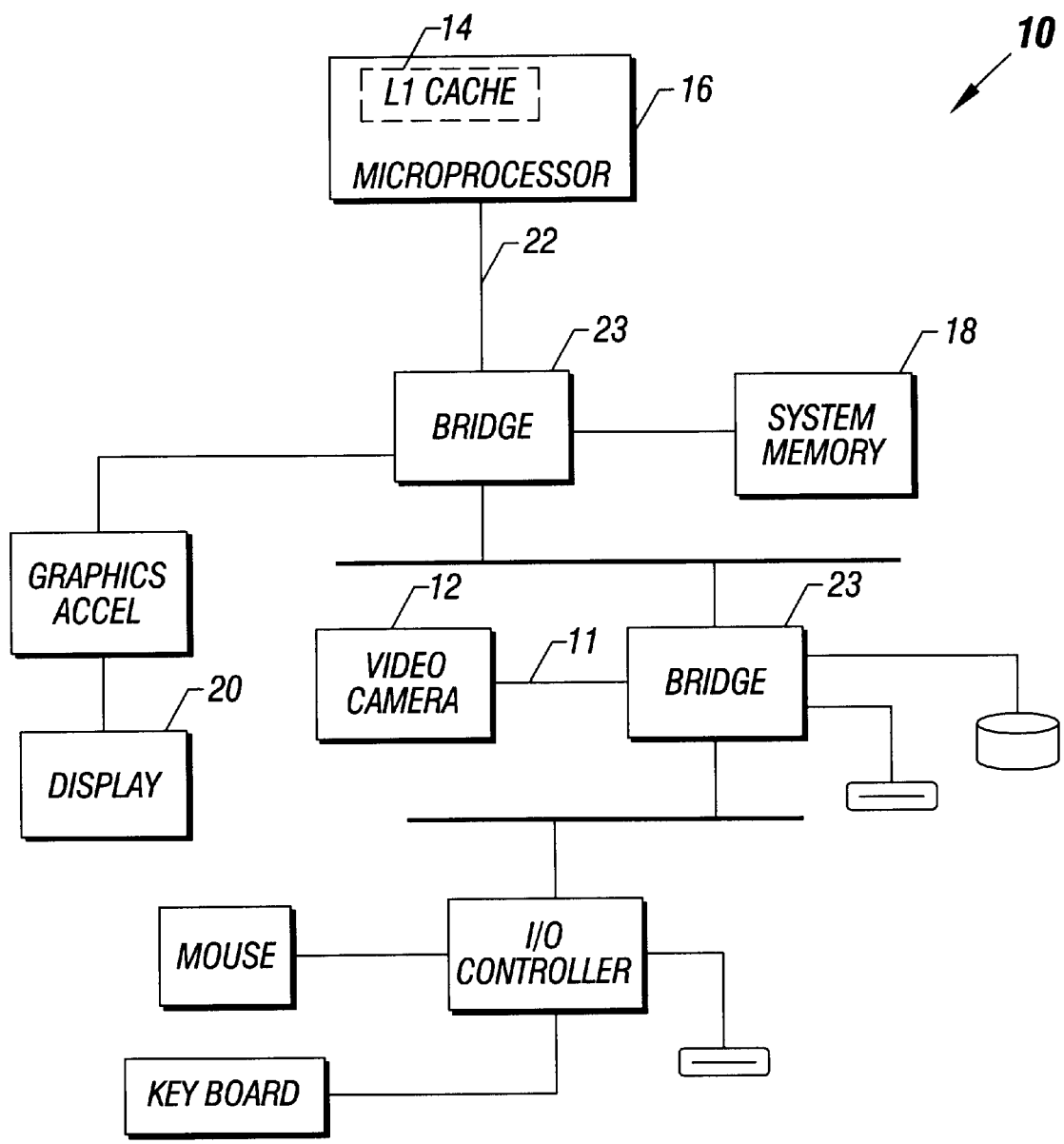
FIG. 1 is a schematic diagram of a computer system of the prior art.
Figure 2:
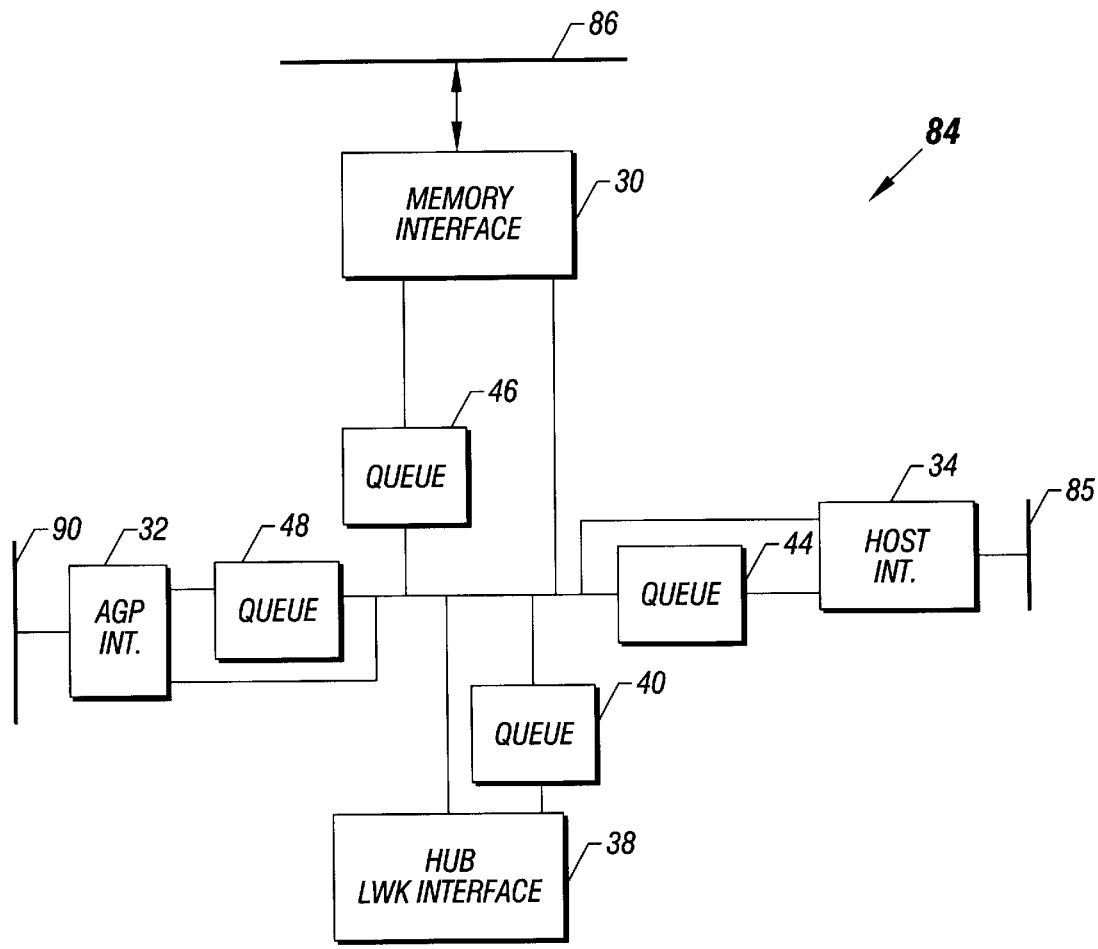
FIG. 2 is a schematic diagram of a bridge according to an embodiment of the invention.

Referring to FIG. 2, an embodiment 84 of a bridge in accordance with the invention includes a transaction queue 44 with features to efficiently handle a stream of data that is received by the bridge 84. In particular, a hub link interface 38 of the bridge 84 may receive requests (read and/or write requests, as examples) that are attributable to a stream of incoming data, such as a stream of video data that originates with a camera or with a block oriented device (a hard disk drive, for example), as examples. Each request indicates information (memory locations, or addresses, for example) that may be used by a memory interface 30 to generate a memory operation (a write operation or a read operation, for example) on a memory bus 86. In this manner, each memory operation may cause a host interface 34 to execute a snoop operation on a local bus 85 to determine if a possible hit occurs with a level one (L1) cache 81 (see FIG. 3) (or a level two (L2) cache, as another example), and thus, numerous write operations may consume excessive bandwidth of the local bus 85. However, the queue 44 is adapted to minimize the number of memory operations that are attributable to the stream of data.

In particular, the queue 44 receives incoming requests and is adapted to combine multiple requests that are directed to memory locations that are associated with the same cache line to form a single request. As an example, the bridge 84 may receive eight, four byte write requests that all target memory locations that are associated with the same cache line. The write requests may be attributable to an incoming stream of video data, for example. Instead of causing the memory interface 30 to generate eight separate write operations in response to these requests (i.e., the conventional response), the queue 44 may, in some embodiments, combine the write requests into a single write request, an action which causes the memory interface 30 to generate one write operation (a block write operation, for example) to transfer all 32 bytes into a system memory 88 (see FIG. 3). Therefore, one snooping operation (instead of eight snooping operations) occurs. As a result, the processing bandwidth of a computer system 80 (see FIG. 3) that uses the bridge 84 may be enhanced.

Although the description refers to combining requests that are directed to a single cache line, the same principles apply to multiple cache lines. In this manner, the queue 44, in some embodiments, combines the requests that are directed to multiple cache lines. However, for purposes of clarity, only a single cache line is described with the understanding that the principles described in this application may extend to multiple cache lines.

In some embodiments, the queue 44 stores requests before the requests are passed to host interface 34. The bridge 84 may include other queues 40, 46 and 48 that are associated with the hub link interface 38, the memory interface 30 and an Accelerated Graphics Port (AGP) interface 32, respectively.

In some embodiments, the queue 44 may implement a first-in-first-out (FIFO) memory. In this manner, as each request propagates to the top of the FIFO memory, the request becomes available to the memory interface 30. Once available, the memory interface 30 may convert the request into the appropriate operation, such as a memory write operation, for example.

Figure 3:
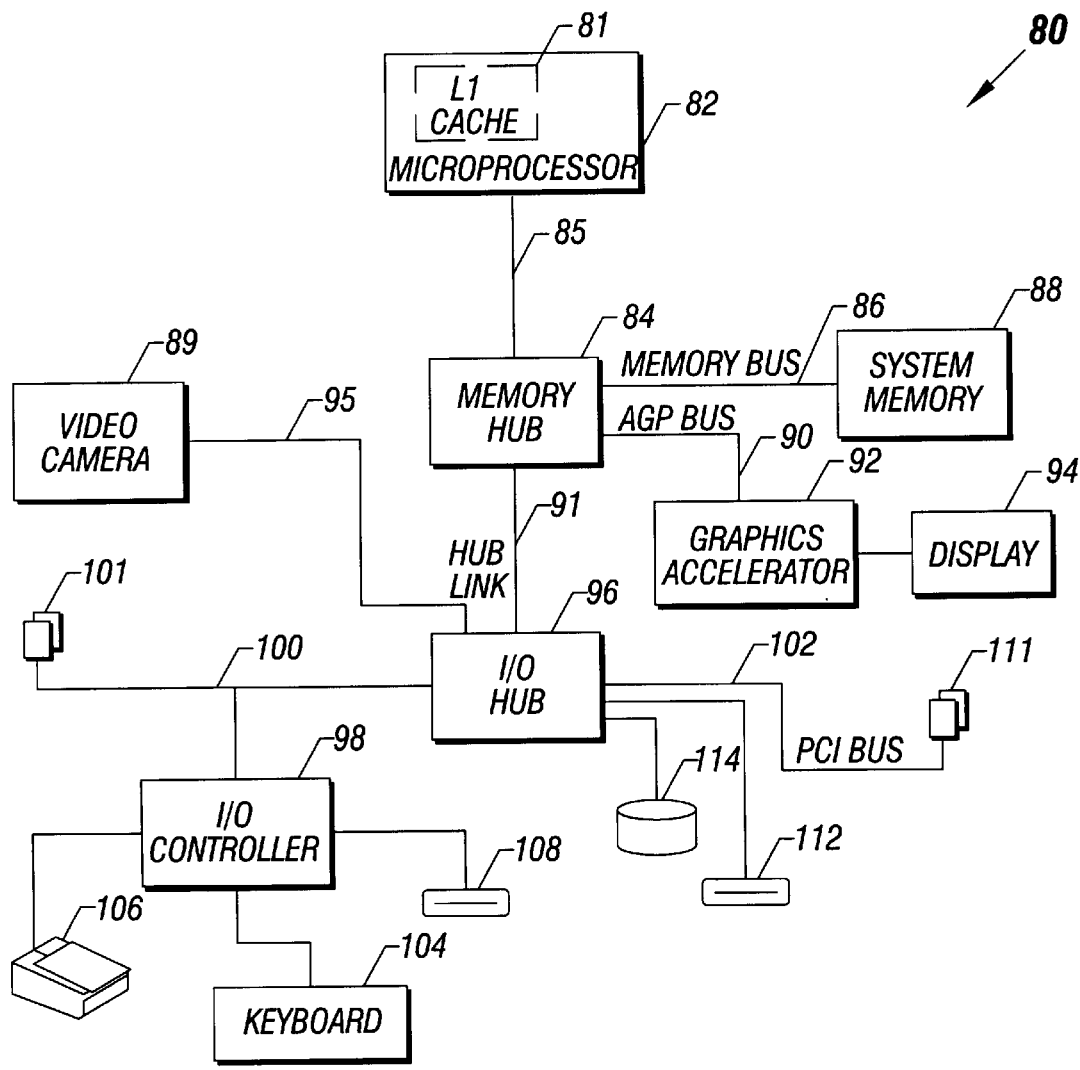
FIG. 3 is a schematic diagram of a computer system according to an embodiment of the invention.

Referring to FIG. 3, in some embodiments, the bridge 84 may be a memory hub that is part of the computer system 80. In this context, the term "computer system" may refer to any system that includes a microprocessor, such as (but not limited to) a desktop computer or a laptop computer.

In some embodiments, the L1 cache 81 may be part of a microprocessor 82 (an X86 microprocessor, a Pentium® microprocessor or a microcontroller, as examples) that communicates with the rest of the computer system 80 via the local bus 85 and the bridge 84. In some embodiments, the computer system 80 may include multiple microprocessors that are also coupled to the local bus 85. The computer system 80 may include a video camera 89 that is coupled to another bridge, or input/output (I/O) hub 96, and the video camera 89 may furnish a stream of data that the I/O hub 96 converts into requests (write requests and/or read requests, as examples). In this manner, the video camera 89 may furnish a stream of video data to a serial bus 95. The serial bus 95, in turn, may propagate signals that indicate the stream to the I/O hub 96. The I/O hub 96 may forward the requests to the memory hub 84 via a hub link 91.

The bridge 84 may also be coupled to a memory bus 86, an AGP bus 90, a cache 83 and the hub link 91. The AGP is further described in detail in the Accelerated Graphics Port Interface Specification, Revision 1.0, published on Jul. 31, 1996 by Intel Corporation of Santa Clara, Calif. The bridge 84 may be coupled to the microprocessor(s) 82 via a host bus 85. A graphics accelerator 92 may be coupled to the AGP bus 90 and control a display 94 that, for example, displays images that are captured by the video camera 89. The system memory 88 may be coupled to a memory bus 86. The memory bus 86, the host bus 85, the AGP bus 90 and the cache 83 may be coupled to the memory interface 30, the host interface 34, the AGP interface 32, and a cache interface 36, respectively.

In some embodiments, the I/O hub 96 may provide interfaces to an I/O expansion bus 100 and a Peripheral Component Interconnect (PCI) bus 102, as examples. The PCI Specification is available from The PCI Special Interest Group, Portland, Oreg. 97214. Furthermore, the I/O hub 96 may provide interfaces to a hard disk drive 114 and a CD-ROM drive 112, as examples. The hard disk drive 114, or any other block oriented device, may, for example, produce requests that are handled by the queue 44, as described in this application. An I/O controller 98 may be coupled to the I/O expansion bus 100 and may control operations of a floppy drive 108. The I/O controller 98 may also receive input signals from a mouse 106 and a keyboard 104, as examples.

The above-described computer system is an exemplary system, and combinations of the above-described components may be integrated separately or fabricated together on the same die. Other computer systems are within the scope of the appended claims.

In the following description, writes requests may be specifically discussed. However, these types of requests illustrate features of some embodiments and should not be considered limiting. For example, the bridge 84 may handle read requests in a similar manner. The bridge 84 may also handle speculative prefetches on read, as described below.

Figure 4:
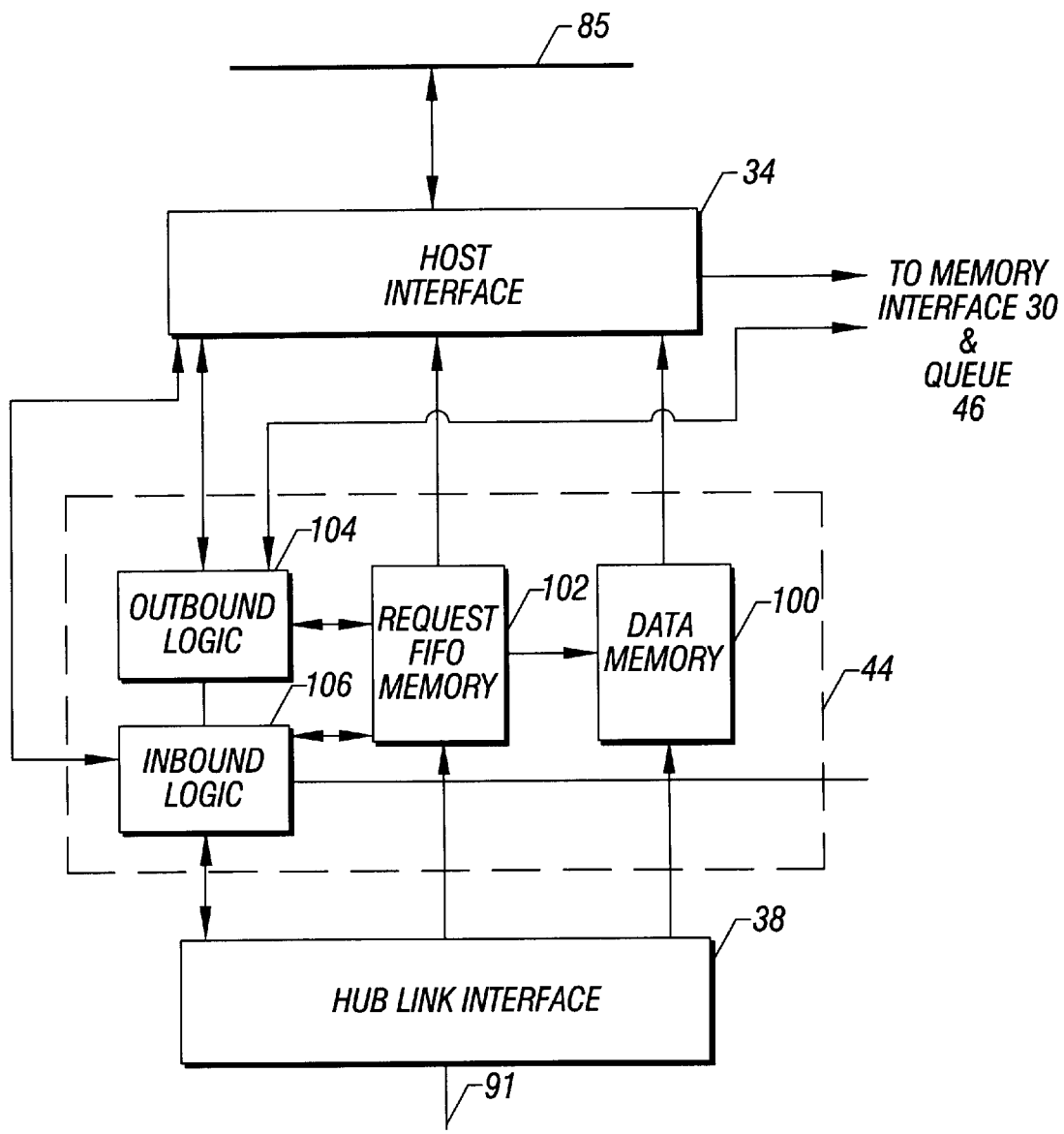
FIG. 4 is a schematic diagram of a queue of the bridge of FIG. 2.

Referring to FIG. 4, in some embodiments, the queue 44 may include a request FIFO memory 102 that may receive requests, such as write requests, from the hub link interface 38. In this manner, each deferred write request propagates from the bottom of the FIFO memory 102 in a first-in-first-out manner through the FIFO memory 102 until the request reaches the top of the FIFO memory 102 and becomes available to an interface, such as the memory interface 30, if the request is not reordered by inbound logic 106. As described below, the inbound logic 106 maintains a pointer to place an incoming request (a write request, as an example) in the FIFO memory 102 to be later removed and transferred to the memory interface 30.

As an example, for an incoming write request that targets a memory location, the inbound logic 106 may additionally determine if the request targets the same cache line as a deferred write request that is stored in the FIFO memory 102. If so, the inbound logic 106 may then combine the two write requests, as described below. In some embodiments, in response to one or more incoming write requests, the inbound logic 106 may further perform a speculative read operation to read one or more cache lines from the device that generated the write requests in an effort to further reduce the number of memory write operations and snooping of the local bus 85.

When the queue 44 receives each incoming request from the hub link interface 38, the inbound logic 106 determines if a request that is stored in the FIFO memory 102 targets memory locations associated with the same cache line. If so, the inbound logic 106 takes appropriate action to combine the requests. For example, the inbound logic 106 may combine two write requests or combine two read requests. In this combination, the inbound logic 106 may append the data and byte enable signals associated with the requests and may change the commands associated with the requests, such as changing a particular write command into a block write command, for example.

In some embodiments, the queue 40 may include outbound logic 104 that maintains a pointer for indicating the next request that is to be transferred from the FIFO memory 102 and into the appropriate interface. In this manner, in some embodiments, the outbound logic 104 traverses the memory locations (called slots) of the FIFO memory 102 in a circular, or "round robin," fashion.

Besides the FIFO memory 102, the queue 44 may also include a data memory 100 that stores data for the associated requests that are stored in the FIFO memory 102. In this manner, each deferred request stored in the memory 102 may indicate an address, a command and a pointer that points to a portion of the data memory 100 that is associated with the request.

Figure 5:
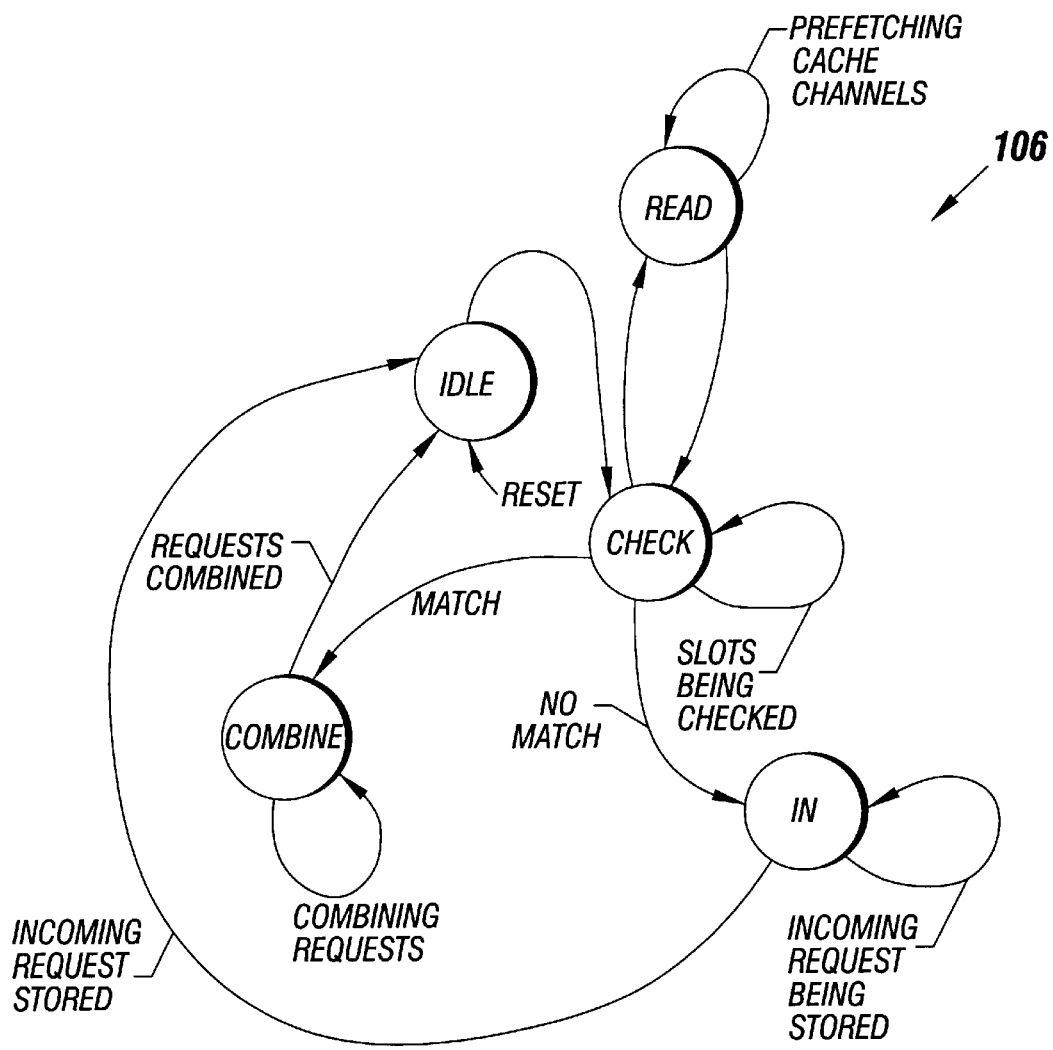
FIGS. 5 and 6 are state diagrams illustrating operations of logic of the queue of FIG. 4.

Referring to FIG. 5, in some embodiments, the inbound logic 106 may behave in the following manner. In the following description, the term "incoming request" generally refers to the most recent request that is received by the queue 44. In an IDLE state, the inbound logic 106 waits as the host interface 34 processes the request at the top of the FIFO memory 102 by snooping the cache 81. In this manner, if the snooped cache line(s) are valid, the host interface 34 may retrieve the cache line(s) and modify them in accordance with the request at the top of the FIFO memory 102. Next, the memory interface 30 may perform a memory operation to execute the request.

Subsequently, for incoming write requests, the inbound logic 106 may transition to a speculative read state called READ. In the READ state, the inbound logic 106 may interact with the hub link interface 38 to read one or more cache lines of data from the device that produced the incoming request. In this manner, the read cache line(s) include data from the incoming request and are based on the assumption that the device will furnish additional write requests that are associated with the entire cache line. Thus, as a result of this read ahead technique, the number of snoop operations that would otherwise occur on the local bus 85 are reduced. The speculative read feature of the bridge 84 may be configured (via configuration registers), for example, by driver software, such as driver software that is associated with block oriented devices (disk drives), for example.

The inbound logic 106 transitions either from the IDLE state or the READ state to a CHECK state in which the inbound logic 106 traverses the slots of the FIFO memory 102 in search of an empty slot. In some embodiments, the inbound logic 106 traverses the slots in a circular fashion and remains in the CHECK state until all slots have been checked. If during this check, the inbound logic 106 determines that the incoming request and one of the requests stored in the FIFO memory 120 target the same cache line, then the inbound logic 106 transitions to a COMBINE state.

In the COMBINE state, in some embodiments, the inbound logic 106 may combine the stored request with the incoming request by replacing the original stored deferred request with a new request that indicates the information in both the incoming and the original requests. Once the inbound logic 106 performs the combination, the inbound logic 106 transitions back to the IDLE state. If no match occurs during the CHECK state, the inbound logic 106 transitions to an IN state in which the inbound logic 106 stores the incoming deferred request in the next available slot. Afterwards, the inbound logic 106 transitions back to the IDLE state.

Figure 6:
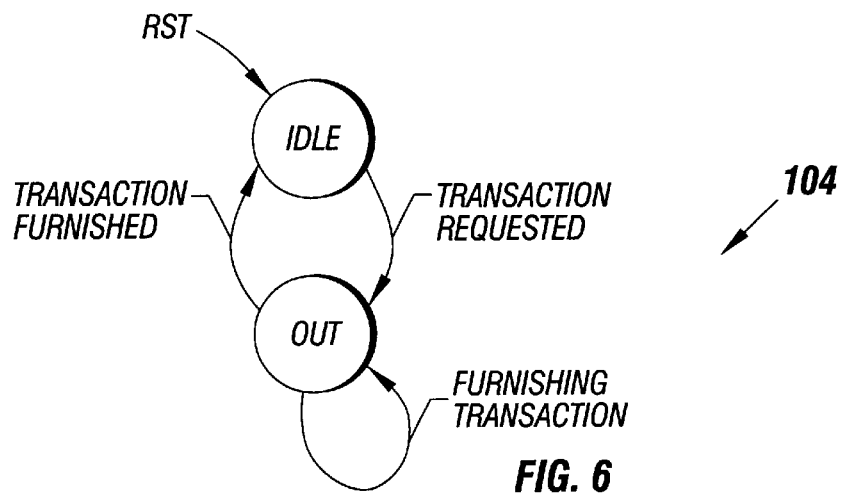

Referring to FIG. 6, in some embodiments, the outbound logic 104 may include at least two states: a IDLE state and an OUT state. The outbound logic 104 may enter the IDLE state when the computer system 80 comes out of a reset, such as after powerup of the computer system 80, for example. The outbound logic 104 transitions from the IDLE state to the OUT state when an interface of the bridge, such as the memory interface 30, requests the next request from the queue 44. The outbound logic 104 remains in the OUT state until the request is furnished to the requesting interface, and afterwards, the outbound logic 104 transitions back to the IDLE state.

Other embodiments are within the scope of the following claims. For example, the phrase "combining requests" refers generally to linking requests together to reduce the number of memory operations that would otherwise occur, and the combination may occur without reducing the number of requests that are otherwise stored in the queue 44. Therefore, in some embodiments, two or more requests that target memory locations that are associated with the same cache line may be stored in the FIFO memory 102. In this manner, in some embodiments, each request may indicate a tag that indicates whether the request should be combined with another request that is stored in the FIFO memory 102. In some embodiments, the inbound logic 106 may associate the appropriate tag with each incoming request before allowing the request to be stored in the FIFO memory 102.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:
1. A computer system comprising:
   a memory including memory locations that are collectively associated with a cache line;
   a peripheral device adapted to furnish a stream of data; and
   bridge circuitry coupled between the memory and the peripheral device, the bridge circuitry comprising:
      a first interface adapted to convert a portion of the stream of data into a first write request;
      a queue adapted to store a second request;
      logic adapted to determine if the first and second requests target memory locations are collectively associated with a cache line and based on the determination, selectively combine the first and second requests; and a second interface adapted to furnish a memory operation in response to the combination of the first and second requests by the logic.

2. The computer system of claim 1, wherein the bridge circuitry comprises a at least a portion of a bridge.

3. The computer system of claim 1, wherein the bridge circuitry comprises at least portions of two bridges.

4. The computer system of claim 1, wherein the peripheral device comprises a camera.

5. The computer system of claim 1, wherein the peripheral device comprises a block oriented device.

6. The computer system of claim 5, wherein the peripheral device comprises a disk drive.

7. The computer system of claim 1, wherein the queue comprises:

a first memory adapted to store the second request; and a second memory adapted to store data associated with the second request.

8. The computer system of claim 1, wherein the first and second requests comprise write requests.

9. The computer system of claim 1, wherein the first and second requests comprise read requests.

10. An apparatus for use with a computer system including a peripheral device that furnishes a stream of data to be stored in a memory, the apparatus comprising:

a first interface adapted to convert a portion of the stream of data into a first write request;

a queue adapted to store a second write request;

logic adapted to determine if the first and second write requests target memory locations that are collectively associated with a cache line and based on the determination, selectively combine the first and second write requests; and a second interface adapted to furnish a write operation to the memory locations in response to the combination of the first and second write requests.

11. The apparatus of claim 10, wherein the apparatus comprises at least a portion of a bridge chip.

12. The apparatus of claim 10, wherein the queue comprises:

a first memory adapted to store the second request; and a second memory adapted to store data associated with the second request.

13. A method for use with a computer system, comprising:

receiving first requests associated with one or more locations of a first memory, the memory locations being collectively associated with a cache line of a cache memory separate from the first memory; and combining the first requests to furnish an operation associated with the first memory.

14. The method of claim 13, wherein the first requests comprise write requests and the operation comprises a write operation.

15. The method of claim 13, wherein the first requests comprise read requests and the operation comprises a read operation.

16. The method of claim 13, further comprising:

receiving a data stream; and generating the first requests from the data stream.

17. The method of claim 13, wherein the first requests comprise write requests, further comprising;

prefetching data associated with at least the cache line based on at least one of the write requests.

18. The method of claim 13, wherein the act of combining comprises:

linking the first requests together.

19. The method of claim 13, wherein the act of combining comprises:

generating a request from the first requests.

20. A method comprising:

receiving a first request;

determining if the first request and a second request stored in a queue target location of a first memory, the requests being collectively associated with a cache line of a cache memory separate loom the first memory; and based on the determination combining the first and second requests to generate a an operation associated with the first memory.

21. The method of claim 20, wherein the first requests comprise write requests and the operation comprises a write operation.

22. The method of claim 20, wherein the first requests comprise read requests and the operation comprises a read operation.

23. The method of claim 20, wherein the act of combining comprises: linking the first and second requests together.

24. The method of claim 20, wherein the act of combining comprises: generating a third request from the first and second requests.

25. The method of claim 24, further comprising:

storing the third write request in the queue.

26. The method of claim 20, further comprising:

retrieving a stream of data from a peripheral device; and generating the first request from a portion of the stream of data.

27. The method of claim 26, wherein the peripheral device comprises a camera.

28. The method of claim 26, wherein the peripheral device comprises a block oriented device.

29. The method of claim 26, wherein the peripheral device comprises a disk drive.

* * * * *

UNITED STATES PATENT AND TRADEMARK OFFICE
CERTIFICATE OF CORRECTION

PATENT NO.    : 6,434,639 B1
DATED         : August 13, 2002
INVENTOR(S)   : Siamack Haghighi It is certified that error appears in the above-identified patent and that said Letters Patent is hereby corrected as shown below:

<u>Column 8,</u>
Line 26, "loom" should be -- from --.

Signed and Sealed this

Fourteenth Day of January, 2003

JAMES E. ROGAN
*Director of the United States Patent and Trademark Office*